(12) United States Patent
Foung (10) Patent No.: US 9,178,345 B2
(45) Date of Patent: *Nov. 3, 2015

(54) CABLE ASSEMBLY HAVING QUICK-LOCKING CONNECTOR AND PREMISE WIRING SYSTEMS UTILIZING SAME

(71) Applicant: Paul Foung, North Brunswick, NJ (US)

(72) Inventor: Paul Foung, North Brunswick, NJ (US)

(*) Notice: Subject to any disclaimer, the term of this patent is extended or adjusted under 35 U.S.C. 154(b) by 113 days.

This patent is subject to a terminal disclaimer.

(21) Appl. No.: 14/101,243

(22) Filed: Dec. 9, 2013

(65) Prior Publication Data

US 2014/0174815 A1 Jun. 26, 2014

Related U.S. Application Data

(63) Continuation of application No. 13/281,325, filed on Oct. 25, 2011, now Pat. No. 8,606,061.

(51) Int. Cl.
*G02B 6/38* (2006.01)
*G02B 6/44* (2006.01)
*H02G 3/18* (2006.01)
*H01R 13/74* (2006.01)
*H01R 24/20* (2011.01)

(52) U.S. Cl.
CPC ............... *H02G 3/18* (2013.01); *G02B 6/4401* (2013.01); *H01R 13/745* (2013.01); *H01R 24/20* (2013.01); *G02B 6/3879* (2013.01); *G02B 6/3897* (2013.01); *G02B 6/4466* (2013.01)

(58) Field of Classification Search
CPC ..... H01R 13/745; H01R 24/20; G02B 6/3879; G02B 6/3897; G02B 6/4466; G02B 6/4401; G02B 6/3891; H02G 3/18
USPC .................................................. 385/100–109
See application file for complete search history.

(56) References Cited

U.S. PATENT DOCUMENTS

| | | | |
|---|---|---|---|
| 5,271,502 | A | 12/1993 | Chang |
| 6,142,815 | A | 11/2000 | Whiteman, Jr. et al. |
| 6,280,257 | B1 | 8/2001 | North et al. |
| 6,435,354 | B1 | 8/2002 | Gray et al. |
| 6,487,091 | B2 | 11/2002 | Malkowski, Jr. et al. |
| 8,606,061 | B2 * | 12/2013 | Foung .......................... 385/100 |
| 2012/0023229 | A1 | 1/2012 | Lee |

* cited by examiner

*Primary Examiner* — Akm Enayet Ullah
(74) *Attorney, Agent, or Firm* — Drinker Biddle & Reath LLP (57) ABSTRACT

Embodiments of the present invention generally relate to a cable assembly for adapting to a premise wiring system, whereby the cables utilized therewith comprise quick-locking connectors thereon. In one embodiment of the present invention, a cable assembly comprises a first cable having a cable portion and a connector on a first end of the first cable, the connector comprising an interface and a locking means for securely engaging a second cable; a housing comprising a body having an aperture therethrough for receiving the first cable, the housing having a panel locking means for engaging a panel, and the panel for securing to a substantially rigid structure, having at least one port therethrough; wherein when the housing engages the panel, the interface of the connector of the first cable is accessible from a side of the panel.

20 Claims, 11 Drawing Sheets

CABLE ASSEMBLY HAVING QUICK-LOCKING CONNECTOR AND PREMISE WIRING SYSTEMS UTILIZING SAME

CROSS-REFERENCE TO RELATED APPLICATIONS

This application is a continuation of U.S. patent application Ser. No. 13/281,325, filed Oct. 25, 2011, entitled "Cable Assembly Having Quick-Locking Connector and Premise Wiring Systems Utilizing Same," the disclosure of which is incorporated herein by reference in its entirety.

BACKGROUND OF THE INVENTION

1. Field of the Invention

Embodiments of the present invention generally relate to a cable assembly having a quick-locking connector and premise wiring systems utilizing the same. More specifically, embodiments of the present invention relate to cable assembly for adapting to a premise wiring system, whereby the cables utilized therewith comprise quick- locking connectors thereon.

2. Description of the Related Art

Premise wiring systems are often found in commercial and residential settings where a user or users may want to have the convenience of wires behind the walls. There are numerous issues that arise with putting such wires behind the walls, ranging from complete wire/cable failure to incompatibility between cabling types and signal generation sources.

Currently, the only types of solutions that exist are in the form of pre-wired wall plates, and complex modular wiring, having pre-wiring built within a keystone for a keystone-type wall plate. A first problem with both these approaches is that both require complete replacement or repair of expensive components if there is a minor flaw in a non-critical component (e.g., plastic casing). A second problem with such types of solutions is that it brings a significant number of new electrical components into the solution for an already difficult problem. And, a third problem with such types of solutions arises during troubleshooting—that is, with so many intricate components, it is difficult to determine the source of a failure when one does occur.

Thus, there is a need for a cable assembly having a quick-locking connector and premise wiring systems utilizing same.

SUMMARY OF THE INVENTION

Embodiments of the present invention generally relate to a cable assembly having a quick-locking connector and premise wiring systems utilizing the same. More specifically, embodiments of the present invention relate to a cable assembly for adapting to a premise wiring system, whereby the cables utilized therewith comprise quick-locking connectors thereon.

In one embodiment of the present invention, a cable assembly comprises a first cable having a cable portion and a connector on a first end of the first cable, the connector comprising an interface and a locking means for securely engaging a second cable; a housing comprising a body having an aperture therethrough for receiving the first cable, the housing having a panel locking means for engaging a panel, and the panel for securing to a substantially rigid structure, having at least one port therethrough; wherein when the housing engages the panel, the interface of the connector of the first cable is accessible from a side of the panel.

In another embodiment of the present invention, a cable assembly comprises a first cable having a cable portion and a connector on a first end of the first cable, the connector comprising an interface, a locking means for securely engaging a second cable; a housing comprising a body having an aperture therethrough for receiving the first cable, the housing having a wall plate locking means for engaging a wall plate from a rear surface thereof, the wall plate for securing to an outer surface of a wall, having at least one port therethrough; and the second cable comprising a locking means guide for receiving the locking means of the first cable; wherein when the housing engages the wall plate, the interface of the connector of the first cable is accessible from the front surface side of the wall plate.

In yet another embodiment, a cable assembly comprises a first cable having a cable portion and a connector on a first end of the first cable, the connector comprising a 9-pin interface, and a locking means for securely engaging a second cable; a housing comprising a body having an aperture therethrough for receiving the first cable, a panel locking means for engaging a panel from a rear surface thereof, a housing guide track for receiving a housing guide on an outer surface of the connector of the first cable, and a cable retaining means for holding the first cable in place; the wall plate for securing to an outer surface of a wall, having at least one port therethrough; and the second cable comprising a locking means guide for receiving the locking means of the first cable; wherein when the housing engages the wall plate, the interface of the connector of the first cable is accessible from the front surface side of the wall plate.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word $^{may}$ is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to a cable assembly having a quick-locking connector and premise wiring systems utilizing the same. More specifically, embodiments of the present invention relate to cable assembly for adapting to a premise wiring system, whereby the cables utilized therewith comprise quick-locking connectors thereon.

Figure 1:
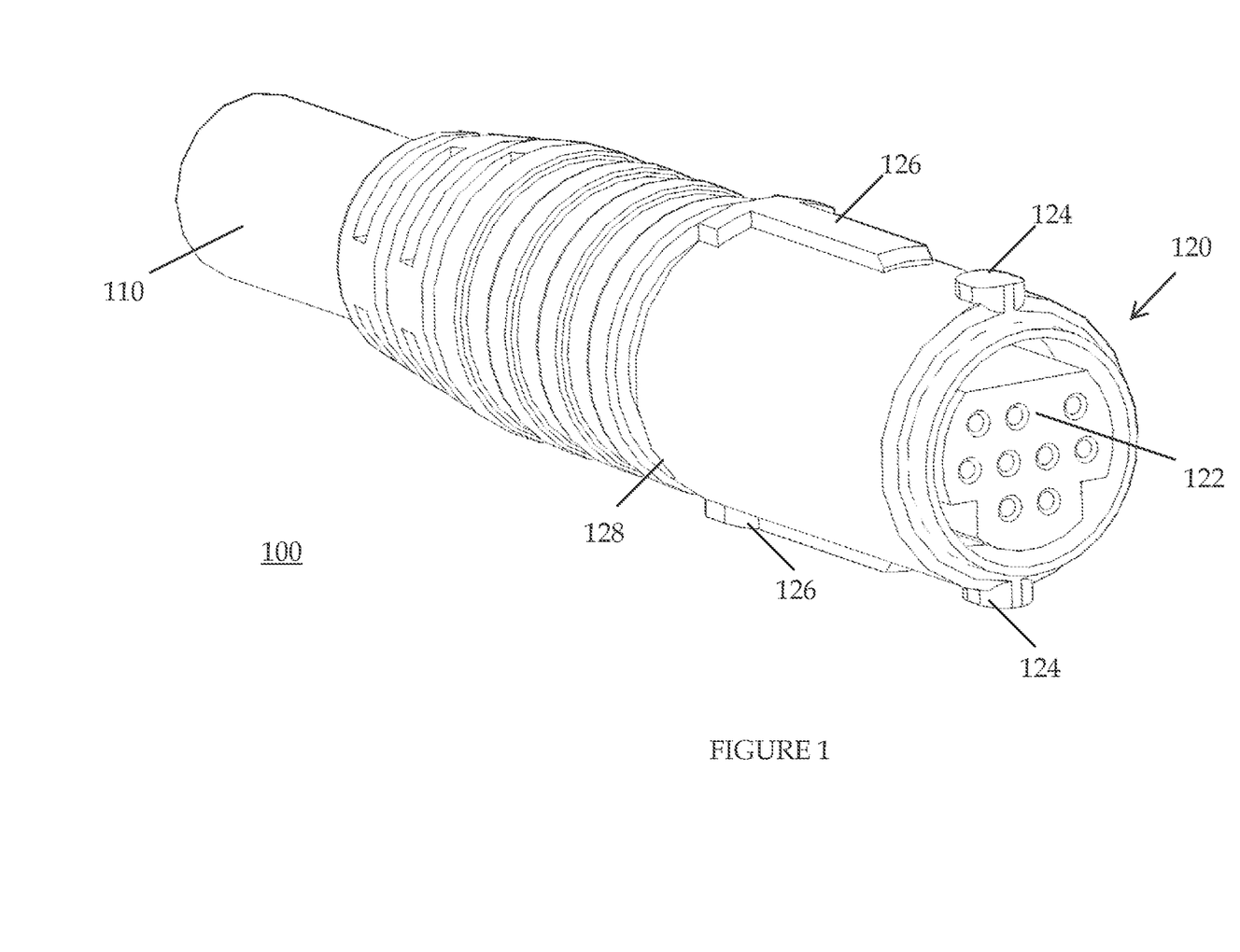
FIG. 1 depicts a perspective view of a cable having a female quick-locking design having in accordance with one embodiment of the present invention.

FIG. 1 depicts a perspective view of a cable having a female quick-locking design having in accordance with one embodiment of the present invention. In accordance with embodiments of the present invention, the cable 100 may generally comprise any type of cable suitable for embodiments of the present invention. In one embodiment, the cable 100 comprises a multi-media cable, such as a control cable, a composite cable, a coaxial cable, a component cable, a S-Video cable, a fiber optic cable or the like. In an alternative embodiment, the cable 100 may comprise any type of Ethernet cable (e.g., Cat 3, Cat 5, Cat 7, or the like). In further embodiments of the present invention, the cable 100 may comprise any type of cable that may traditionally be found in residential or commercial premise wiring systems.

Generally, a cable comprises at least a cable section 110 and a connector 120. The cable section 110 may comprise any length of wiring extending from the connector 120 to an opposing end of the wiring, often terminated by a second connector (not shown). In many embodiments of the present invention, the connector 120 comprises at least an interface 122 and a locking means 124. As shown, the locking means 124 may comprise any type of structural protrusion or arrangement, capable of connecting with an opposing connector as described infra. The interface 122 of the connector 120 may comprise any suitable interface depending upon the nature of the cable 100. For example, as shown, the interface 122 comprises a female 9-pin interface, which may be suitable and capable with S-Video wiring. Any known type of connector interface may also be suitable for various embodiments of the present invention. For example, a connector interface having as few as two to as many as 18 or 19 pins may be suitable for embodiments of the present invention. In another example, any shape connector interface, including square, circular or the like, may be suitable for embodiments of the present invention as well.

Optionally, the connector 120 may further comprise a housing guide 126 for aligning with a housing as described infra. Similarly, the connector may optionally comprise a rim 128 for receiving a securing means of the housing, which is also explained infra. Although both the housing guide 126 and the rim 128 are shown as having a specific structure, embodiments of the present invention contemplate any type of structure capable of attaining the specific functions of each expressly disclosed element of design.

Figure 2:
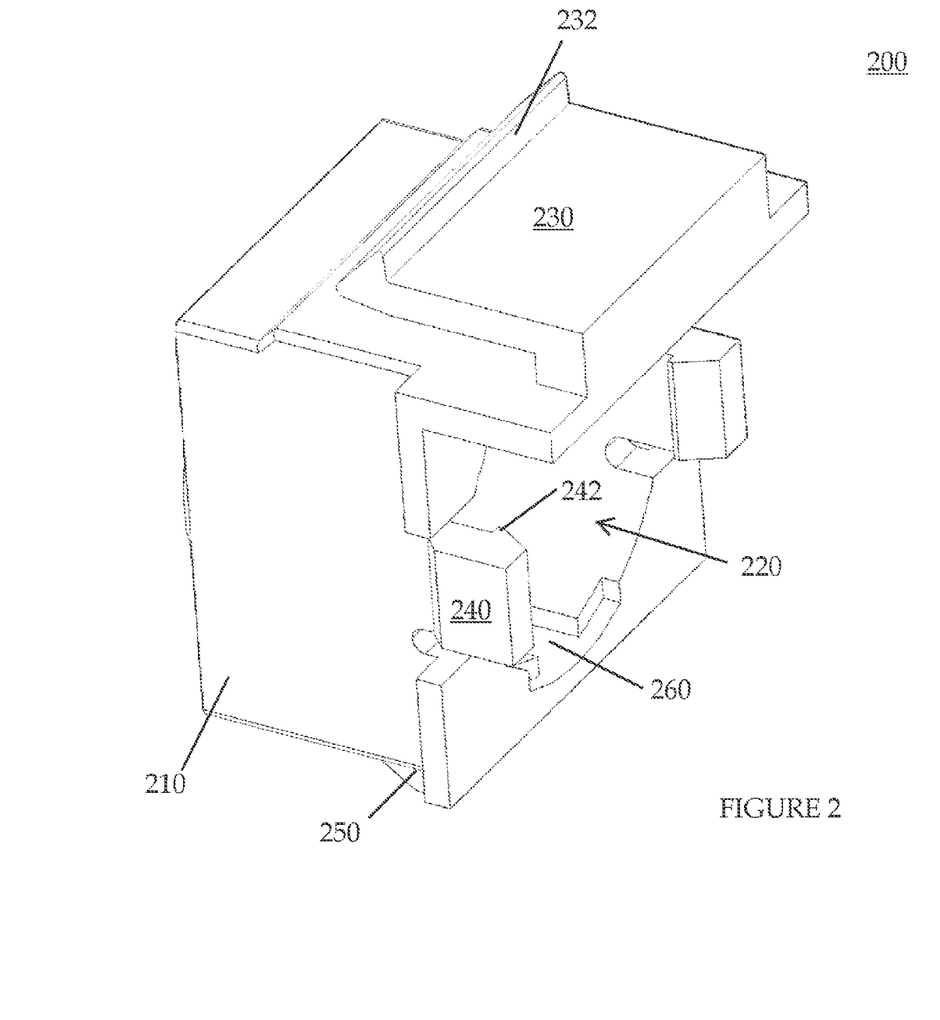
FIG. 2 depicts a perspective view of a housing in accordance with one embodiment of the present invention.

FIG. 2 depicts a perspective view of a housing in accordance with one embodiment of the present invention. The housing 200 generally comprises a primary body 210 having an aperture 220 therethrough for receiving a cable. In many embodiments, the housing 200 may also comprise a panel locking means 230 (also called a "wall plate locking means") having a retaining lip 232 thereon. In other embodiments, the housing 200 may also comprise at least one cable retaining means 240, also having a retaining lip 242 thereon. As shown, a pair of opposing cable retaining means 240 may be provided.

In certain embodiments, the housing 200 may be provided with a panel support 250 (also called a "wall plate locking means"), which is positioned on a bottom surface of the housing body 210, for assisting the housing 200 to securely fit within a panel in use. In addition, the housing 200 may also comprise a housing guide track 260 for receiving the housing guide of the cable, as described supra. As shown, the housing guide track 260 may comprise a recessed portion of the inner surface of wall along the aperture 220.

Figure 3A:
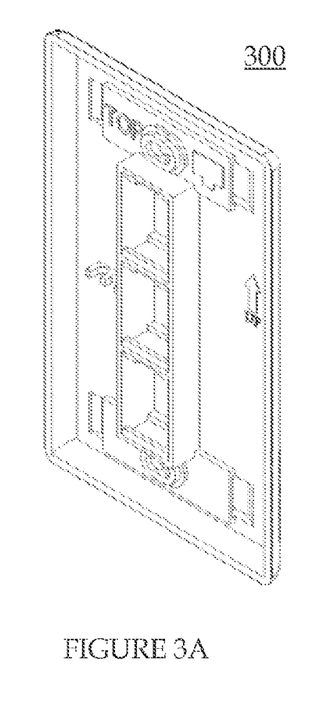
FIG. 3A depicts a perspective view of a wall plate in accordance with one embodiment of the present invention.
Figure 3B:
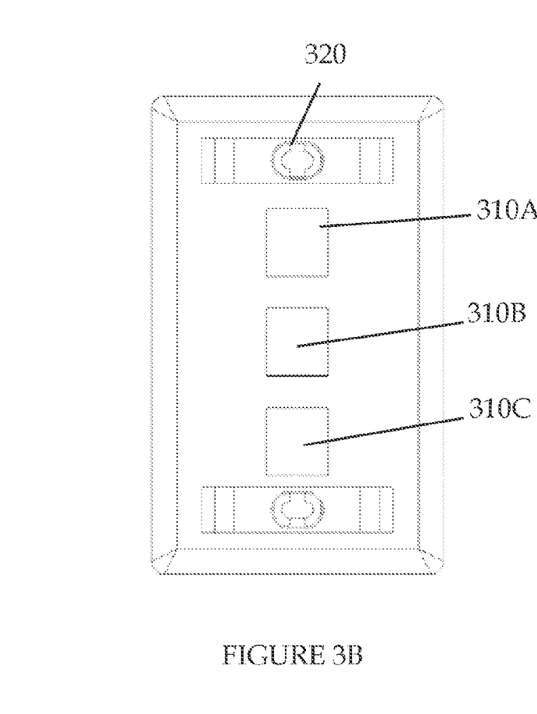
FIG. 3B depicts a front view of the wall plate shown in FIG. 3A.
Figure 3C:
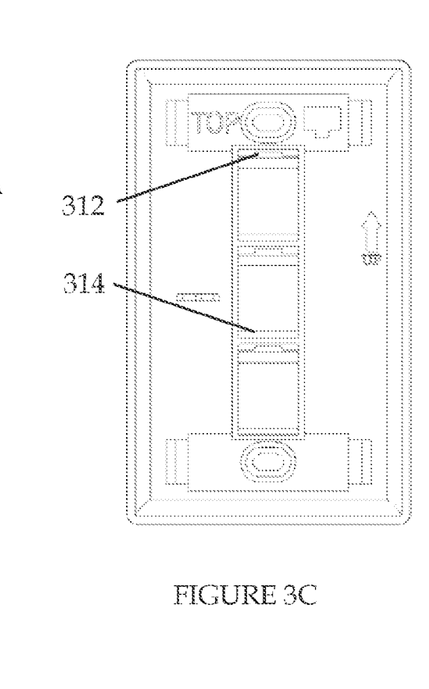
FIG. 3C depicts a rear view of the wall plate shown in FIG. 3A.

FIGS. 3A, 3B and 3C depict a perspective, front and rear view of a wall plate, respectively, in accordance with one embodiment of the present invention. The wall plate 300 may generally comprise a plurality of ports 310A, 310B, 310C, and at least a fastening hole 320 for securing the wall plate 300 against a wall (not shown). While three ports 310 are shown, various embodiments of the present invention may comprise any number of ports, from as low as one port, to as many as are structurally and reasonably feasible to achieve the intended results of embodiments of the present invention.

As shown in FIG. 3C, each of the ports 310 within the wall plate may comprise a receiving means 312 for receiving the wall plate locking means of the housing. The receiving means 312 may comprise any structural design suitable for accommodating the wall plate locking means of the housing, and retaining it in place during normal use. Additionally, each of the ports 310 may comprise a base surface 314 against which the wall plate support of the housing may rest.

In accordance with embodiments of the present invention, the wall plate 300 may comprise any material suitable for embodiments of the present invention. In many embodiments, the wall plate 300 may comprise a polymer, however, common wall plate materials such as wood or metals may also be utilized.

In alternative embodiments of the present invention, a wall plate may be replaced with a panel, a router, or similar device capable of supporting a cable therethrough. In many alternative embodiments, the panel may comprise any device having keystone type holes, or similarly functioning design to secure a cable's positioning within a rigid body.

Figure 4A:
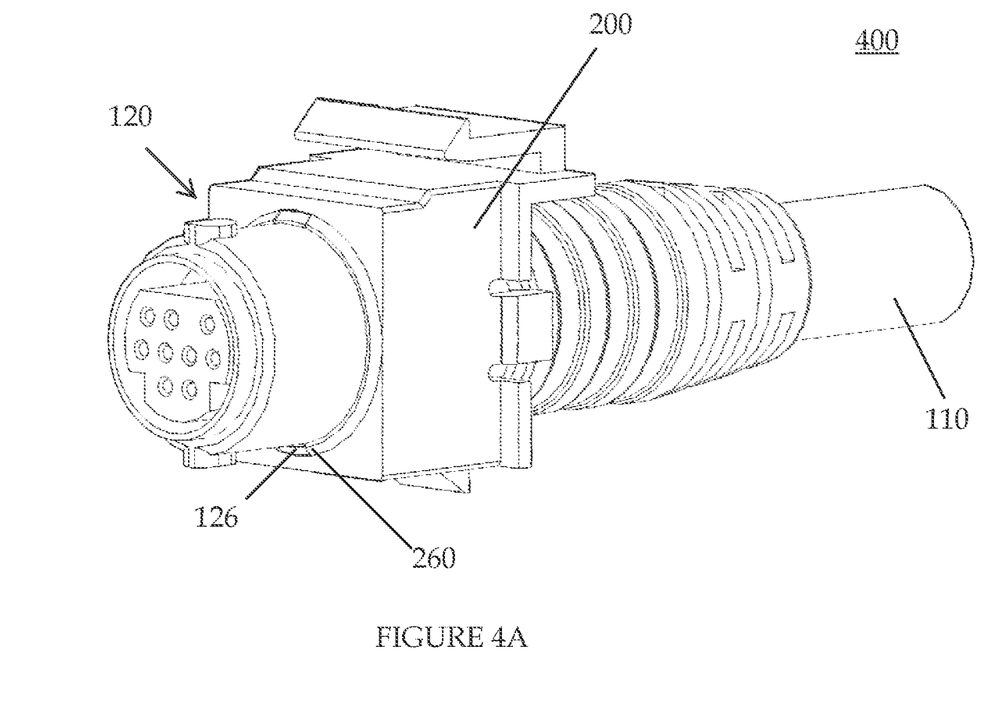
FIG. 4A depicts a front perspective view of a connector-housing assembly in accordance with one embodiment of the present invention.
Figure 4B:
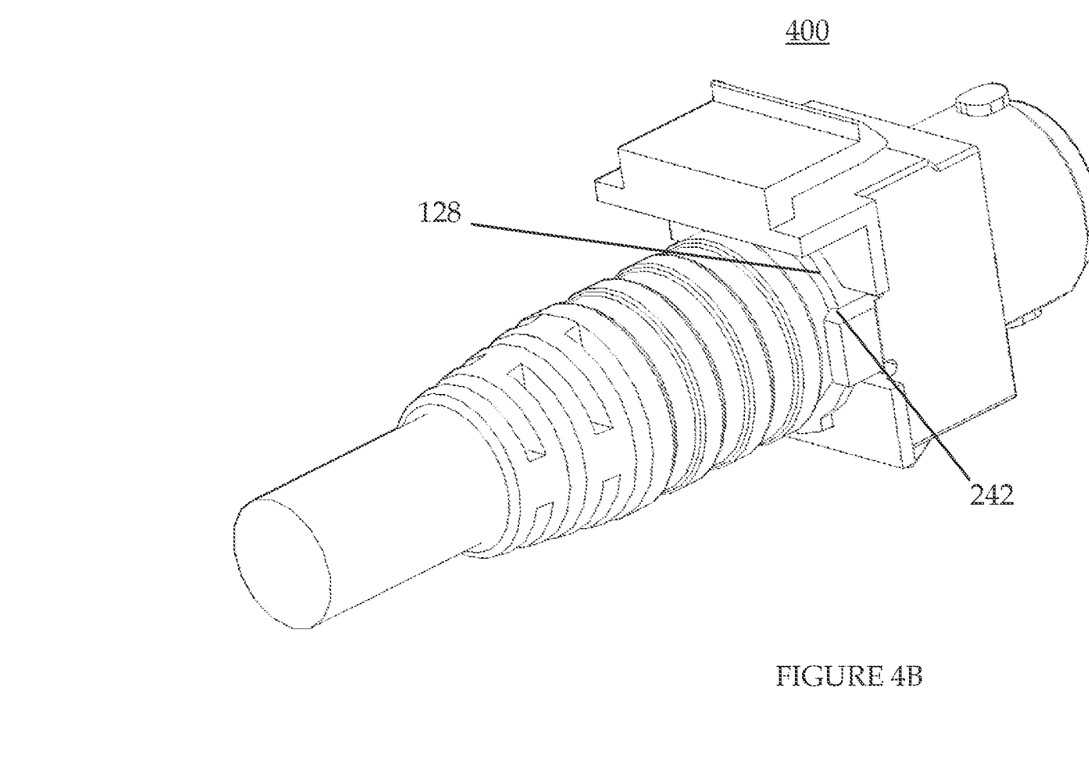
FIG. 4B depicts a rear perspective view of the connector-housing assembly as shown in FIG. 4A.

FIGS. 4A and 4B depict front and rear perspective views of a connector-housing assembly, respectively, in accordance with one embodiment of the present invention. As shown in the Figures, the connector-housing assembly 400 comprises a cable having a housing 200 fitted over the connector 120. Initially, to create the connector-housing assembly 400, the housing guide track 260 may be lined up with the housing guide 126. The housing 200 is subsequently pushed over the connector end of the cable until it is appropriately in position for adaption to the wall plate. As shown in FIG. 4B, in several embodiments, the housing 200 may be in position for adaption to the wall plate when the retaining lip 242 of the cable retaining means 240 extends over the rim 128. Depending on the structural design of the retaining lip 242, cable retaining means 240 and rim 128, in many embodiments, once the retaining lip 242 extends over the rim the housing 200 is locked in place until the housing is either broken or the individual desires to remove it and utilizes sufficient force. In certain instances, the housing 200 may be further limited in motion by the size and shape of the housing guide 126 and the corresponding housing guide track 260.

Figure 5A:
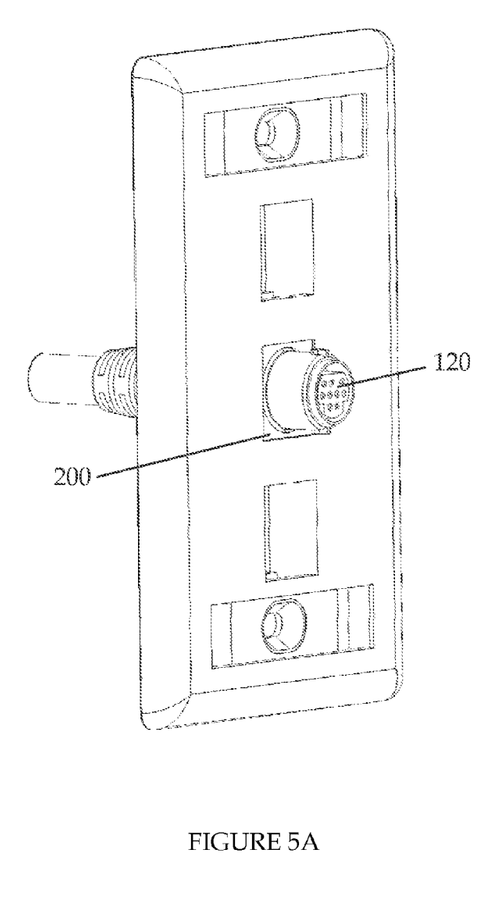
FIG. 5A depicts a front perspective view of a connector-housing assembly positioned in a wall plate in accordance with one embodiment of the present invention.
Figure 5B:
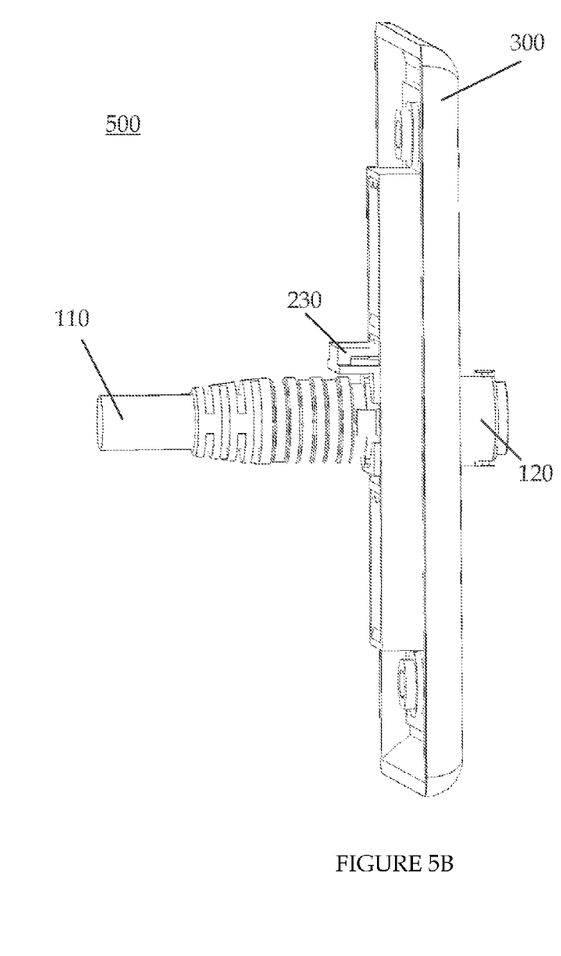
FIG. 5B depicts a rear perspective view of the connector-housing assembly positioned in a wall plate as shown in FIG. 5A.

FIGS. 5A and 5B depict front and rear perspective view of a connector-housing assembly positioned in a wall plate, respectively, in accordance with one embodiment of the present invention. As shown in the Figures, a connector-housing assembly may be placed into an open port of the wall plate 300 and held in place. In many embodiments, the connector-housing assembly is secured to the wall plate via the wall plate locking means 230 engaging the receiving means of the wall plate. Once in position, a front surface of the housing may line up substantially flush with a front surface of the wall plate, as shown in FIG. 5B.

In the embodiments shown in the Figures, the wall plate locking means 230 comprises a biased lever on the top surface of the housing having a retaining lip protruding from a top surface thereof to engage a receiving means, which may generally comprise a lip or ridge structure. However, various embodiments of the present invention contemplate a variety of structures to attain the same intended results.

Figure 6:
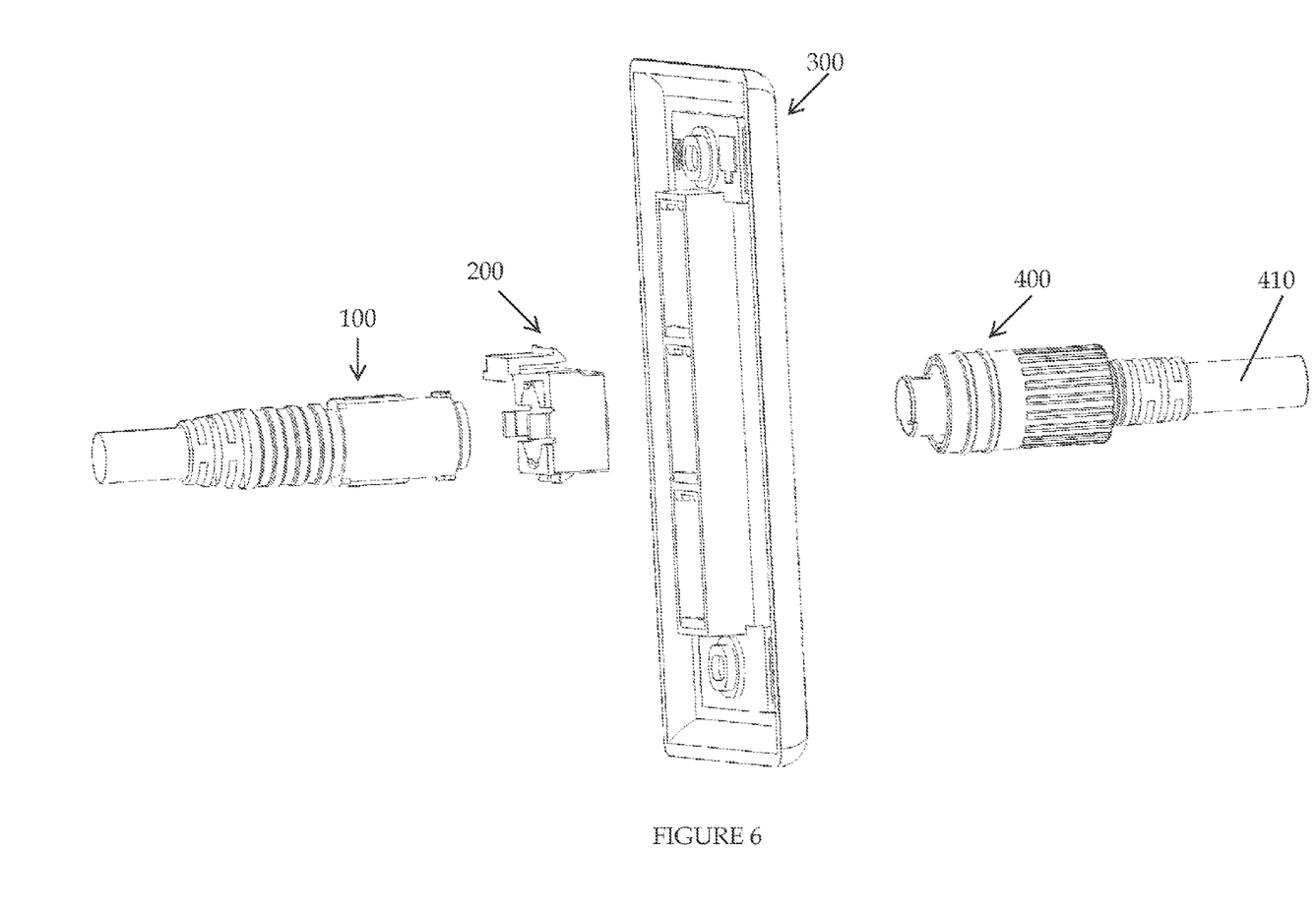
FIG. 6 depicts an exploded view of a wiring system in accordance with one embodiment of the present invention.

FIG. 6 depicts an exploded view of a wiring system in accordance with one embodiment of the present invention. As shown in the Figure, the wiring system may comprise a first cable 100, a housing 200 adaptable to the first cable, a wall plate 300 and a second cable 400. The creation of the connector-housing assembly positioned in a wall plate is discussed supra.

In accordance with embodiments of the present invention, the second cable 400 comprises a cable portion 410 and a connector. In many embodiments, the second cable 400 comprises a multi-media cable, such as a composite cable, a coaxial cable, a component cable, a S-Video cable, a fiber optic cable or the like. However, similar types of cables, such as those described supra, are suitable for embodiments of the present invention. Generally, however, the nature of the second cable 400 will be substantially similar to the nature of the first cable 100.

In most embodiments, the connector of the second cable 400 may comprise any compatible connector suitable to adapt to the connector of the first cable 100. In certain embodiments, however, an interconnection device may be needed to adapt the connector of the second cable 400 to the connector of the first cable 100. In such an embodiment, the interconnection device may generally comprise any type of external (i.e., on the second cable side of the wall plate) device capable of converting one of signal to another. In the event such a device is needed, the connector of the interconnection device may generally comprise the quick-locking features described herein with regard to the first and second cable connectors.

Figure 7:
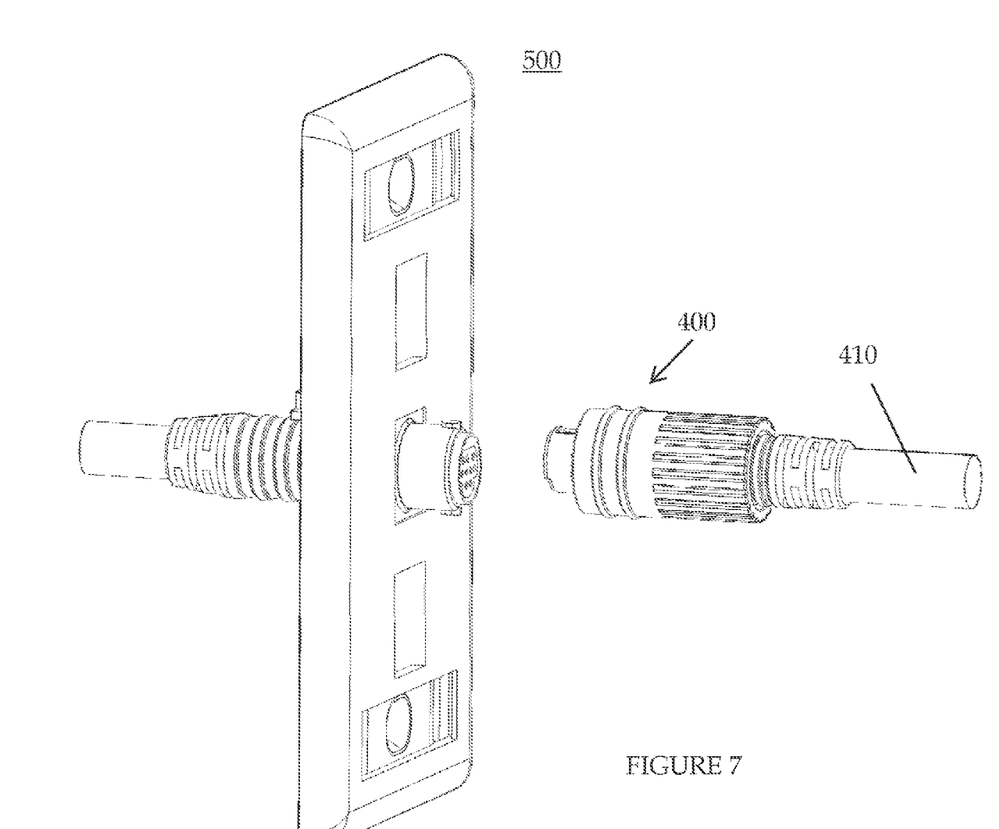
FIG. 7 depicts a perspective view of a partially assembled wiring system in accordance with one embodiment of the present invention.
Figure 8:
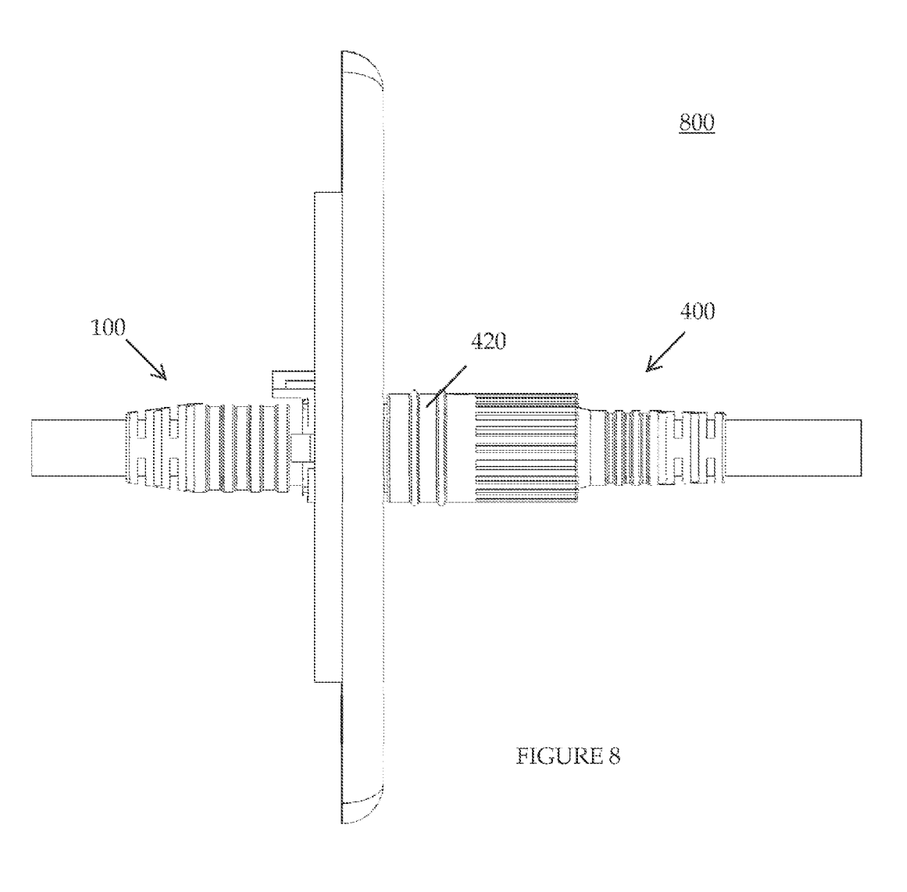
FIG. 8 depicts a side view of a wiring system in accordance with one embodiment of the present invention.

FIG. 7 depicts a perspective view of a partially assembled wiring system in accordance with one embodiment of the present invention. As shown in the Figure, when the connector-housing assembly is already positioned in a wall plate, the only remaining component to connect is the second cable 400. FIG. 8 depicts a side view of a wiring system in accordance with one embodiment of the present invention. Once the second cable 400 is connected to the connector of the first cable, the wiring system is operational. Depending on the nature of the entire system, the first or second cables may be responsible for providing and/or sending data regarding the intended subject matter (i.e., multi-media content, etc.).

Figure 9:
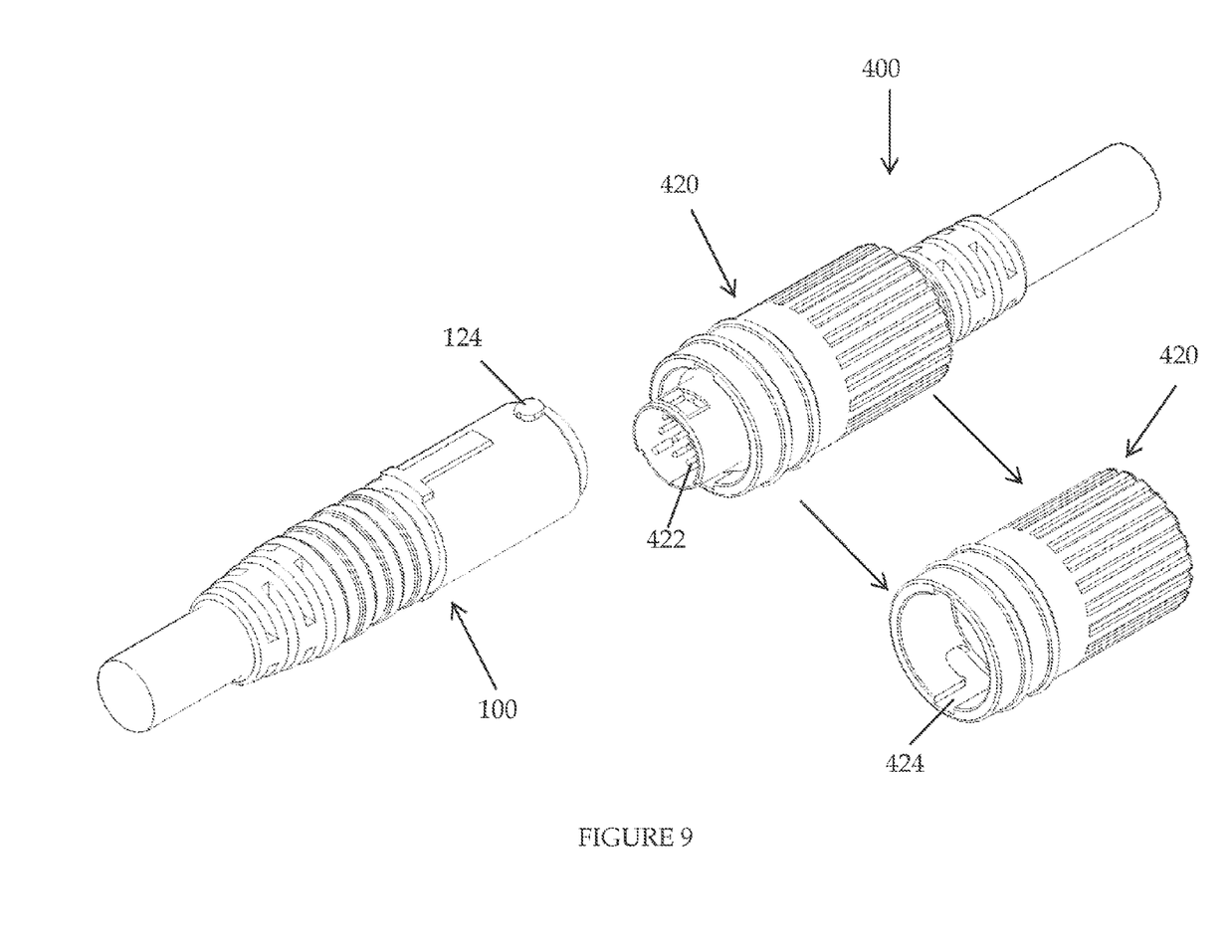
FIG. 9 depicts a perspective view of a quick-locking connector assembly in accordance with one embodiment of the present invention.

FIG. 9 depicts a perspective view of a quick-locking connector assembly in accordance with one embodiment of the present invention. Viewing just the connector of the first cable 100 and the connector 420 of the second cable 400, the quick-locking features of embodiments of the present invention become apparent. In order to connect the two connectors, the locking means 124 may align with the locking means guide 424. By pushing the connectors together with such components aligned, the connector 420 may then be rotated (i.e., about at least $\frac{1}{16}$ of an inch or greater) to lock the locking means in place with the locking means guide 424.

In many embodiments, the connector 420 of the second cable 400 comprises a ring, which is rotatable about the cable. In such embodiments, the second connector 420 may connect to the first connector by merely rotating the ring therearound without needing to worry about misalignment of the pins, as the quick-locking connector will substantially assure proper alignment.

Embodiments of the present invention may be utilized for any type of cabling or wiring system, but is particularly designed for any type of premise wiring system. For example, embodiments of the present invention are intended for residential and/or commercial establishments where the utilization of extant behind-the-walls cabling may be advantageous.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A cable assembly comprising:
    a first cable having a cable portion and a connector on a first end of the first cable, the connector comprising an interface and a locking means for securely engaging a second cable;
    a housing comprising a body having an aperture therethrough for receiving the first cable, the housing having a panel locking means for engaging a panel, and
    the panel for securing to a substantially rigid structure, having at least one port therethrough;
    wherein when the housing engages the panel, the interface of the connector of the first cable is accessible from a side of the panel.

2. The cable assembly of claim 1, wherein the first cable comprises one of at least a control cable, a composite cable, a coaxial cable, a component cable, a S-Video cable, a fiber optic cable, or an Ethernet cable.

3. The cable assembly of claim 1, wherein the interface of the connector of the first cable comprises a 9-pin interface.

4. The cable assembly of claim 3, wherein the interface comprises the female end of a 9-pin interface.

5. The cable assembly of claim 1, wherein the housing further comprises a housing guide track for receiving a housing guide on an outer surface of the connector of the first cable.

6. The cable assembly of claim 1, wherein the housing further comprises a cable retaining means for holding the first cable in place.

7. The cable assembly of claim 6, wherein the cable retaining means further comprises a retaining lip for securing the first cable about a rim on a distal end of the connector of the first cable.

8. The cable assembly of claim 1, wherein the first cable securely engages a second cable by pushing the connector of the first cable together with a connector of the second cable, and rotating at least one of the connectors.

9. The cable assembly of claim 8, wherein the panel locking means further comprises a retaining lip for securing the housing to the panel about a receiving means within a port of the panel.

10. A cable assembly comprising:
- a first cable having a cable portion and a connector on a first end of the first cable, the connector comprising an interface, a locking means for securely engaging a second cable;
- a housing comprising a body having an aperture therethrough for receiving the first cable, the housing having a wall plate locking means for engaging a wall plate;
- the wall plate for securing to an outer surface of a wall, having at least one port therethrough; and
- the second cable comprising a locking means guide for receiving the locking means of the first cable;
- wherein when the housing engages the panel, the interface of the connector of the first cable is accessible from a side of the panel.

11. The cable assembly of claim 10, wherein the first cable and the second cable each comprise one of at least a control cable, a composite cable, a coaxial cable, a component cable, a S-Video cable, a fiber optic cable, or an Ethernet cable.

12. The cable assembly of claim 11, wherein the interface of the connector of the first cable and an interface of the connector of the second cable comprise a 9-pin interface.

13. The cable assembly of claim 10, wherein the housing further comprises a housing guide track for receiving a housing guide on an outer surface of the connector of the first cable.

14. The cable assembly of claim 10, wherein the housing further comprises a cable retaining means for holding the first cable in place.

15. The cable assembly of claim 14, wherein the cable retaining means further comprises a retaining lip for securing the first cable about a rim on a distal end of the connector of the first cable.

16. The cable assembly of claim 10, wherein the wall plate locking means further comprises a retaining lip for securing the housing to the wall plate about a receiving means within a port of the wall plate.

17. The cable assembly of claim 10, wherein the first cable securely engages the second cable by pushing the connector of the first cable together with the connector of the second cable, and rotating at least one of the connectors.

18. The cable assembly of claim 10, wherein the second cable comprises a ring around the connector of the second cable, whereby the connector of the second cable may be rotated by the ring.

19. A cable assembly comprising:
- a first cable having a cable portion and a connector on a first end of the first cable, the connector comprising a 9-pin interface, and a locking means for securely engaging a second cable;
- a housing comprising a body having an aperture therethrough for receiving the first cable, a wall plate locking means for engaging a wall plate, a housing guide track for receiving a housing guide on an outer surface of the connector of the first cable, and a cable retaining means for holding the first cable in place;
- the wall plate for securing to an outer surface of a wall, having at least one port therethrough; and
- the second cable comprising a locking means guide for receiving the locking means of the first cable;
- wherein when the housing engages the panel, the interface of the connector of the first cable is accessible from a side of the panel.

20. The cable assembly of claim 19, wherein the wall plate locking means further comprises a retaining lip for securing the housing to the wall plate about a receiving means within a port of the wall plate.

* * * * *